July 9, 1929.  A. ALLEN  1,720,112
AUTOMATIC MIXING BIN
Filed April 5, 1928   2 Sheets-Sheet 2
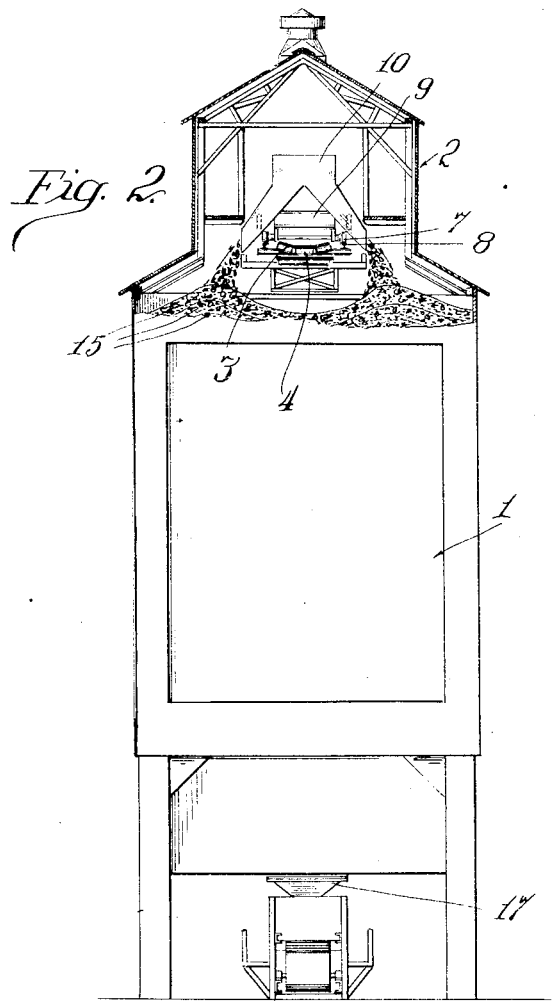
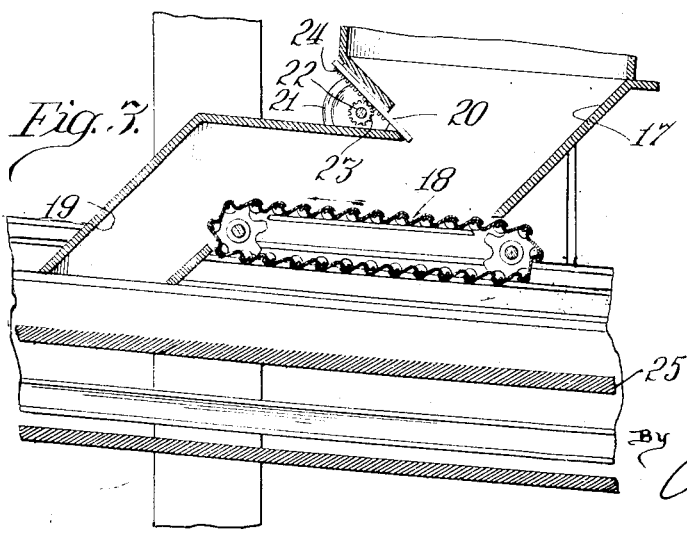
Inventor
Andrews Allen
By
Barnett & Truman
Attorneys Patented July 9, 1929.

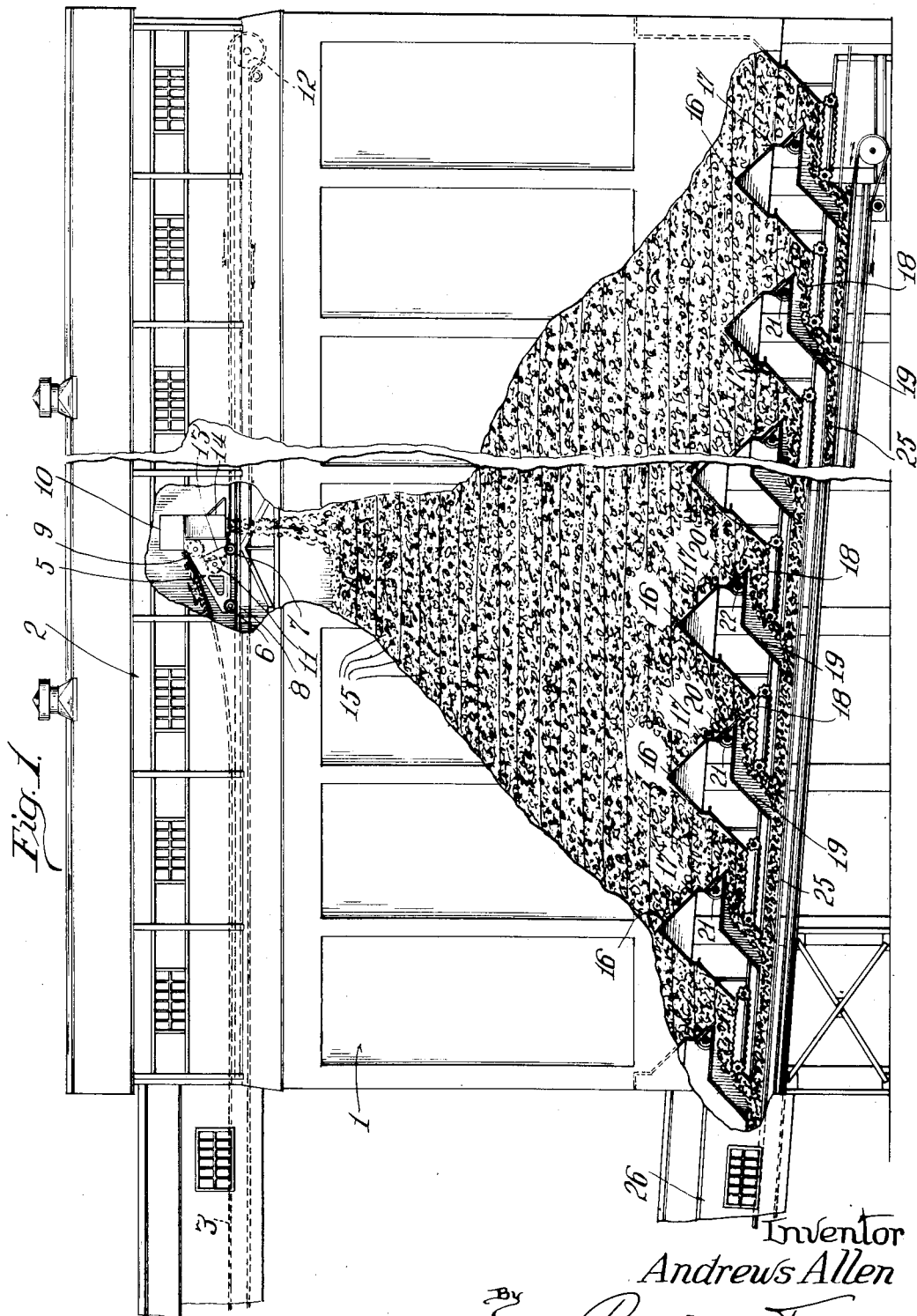

1,720,112

UNITED STATES PATENT OFFICE.

ANDREWS ALLEN, OF GLENCOE, ILLINOIS, ASSIGNOR TO ALLEN & GARCIA COMPANY, OF CHICAGO, ILLINOIS, A CORPORATION OF ILLINOIS.

AUTOMATIC MIXING BIN.

Application filed April 5, 1928. Serial No. 267,497.

This invention relates to a new and improved process and apparatus for mixing materials such as coal or ore, in fragmentary or comminuted form, so that a substantially uniform run of the material may be obtained from successive lots which may vary considerably in quality or richness.

In many industries involving the treatment or use of materials, such as coal or ore, it is necessary to provide an operating storage frequently amounting to many thousands of tons. Different lots of this material as received from mines or shipments vary considerably in quality or richness, and in order to conduct the operations of smelting, washing, coking or other similar operations, it is highly desirable and sometimes absolutely necessary to draw this material from storage in the form of an average mixture so that the properties or richness of the material will be substantially constant and uniform, and will, therefore, allow economical and efficient results in the manufacturing or milling process to which the material is subjected.

This result has hitherto been accomplished by the process known as "bedding," in which a long pile of the material is laid down by a tripper moving slowly and continuously from one end of the pile to the other. Material is then withdrawn from the pile by means of a scraper or other means which slices the pile across one end, so that every slice will cut all of the beds of the material and will therefore be composed of a substantially equal mixture of all the layers. It is evident, however, that in order to provide for continuous operation, it is necessary to maintain at least two such bedded piles, each with its own bedding and recovering apparatus. One of these piles will be in the process of making, and the other in process of being drawn off. It is also evident that if the material is to be brought into storage during only one shift, that is during a comparatively short interval of time, whereas it is drawn out or used continuously, or during two or three shifts, it will be necessary to provide additional bedded storage piles. Three piles is usual for industries where the operation is continuous and the input variable.

According to the present invention, a specially constructed bin is utilized, provided with means for bedding the material within the bin from the top, and for withdrawing the material from the bottom of the bin, the operations being wholly or partly automatic and continuous, so that one bin and one set of apparatus for filling and discharging the bin will serve for practically continuous draw-off during one, two or three shift operations, whereas the feed may be intermittent or during one shift only. Preferably a long, rectangular bin is utilized, of sufficient height to permit storage of the requisite quantity of material. Apparatus positioned above the bin automatically lays down the material in successive, substantially parallel layers. A plurality of feeders, of any desired form, are spaced at frequent intervals along the bottom of the bin, so as to simultaneously draw off material from substantially all portions of the bottom of the bedded mass of material within the bin. The parts are so arranged that the approximate plane along which the feeders draw off material is inclined to the parallel planes of the beds or layers, so that the several feeders will simultaneously draw material from different layers within the bin. The feeders all deliver the material to a traveling belt conveyor which serves to collect and assemble the different lots of material withdrawn by the several feeders and deliver all of this mixed material to some desired location.

The principal object of this invention is to provide a new process and apparatus for mixing materials, such as briefly described hereinabove, and as disclosed more in detail in the description which follows:

Other objects and advantages of this invention will be more apparent from the following detailed description of one approved form of the apparatus.

In the accompanying drawings:

Fig. 1 is a side elevation of the bin, partly in vertical section.

Fig. 2 is an end elevation of the bin, partly in vertical section.

Fig. 3 is a vertical longitudinal section through one of the feeding mechanisms.

The long, rectangular bin 1 will vary in size and proportions according to the desired capacity of the particular installation for which it is designed. Preferably the bin should be of sufficient size and length so that any one carload or lot of material may be bedded down within the bin in less than one horizontal layer, as hereinafter described.

The bin should be of sufficient height to permit storage of the material necessary for continuous operation during two or three successive shifts.

The receiving and bedding mechanism is housed within a suitable super-structure 2 at the top of the bin. An endless belt conveyor 3, of usual type, is mounted to travel in the direction of the arrows, the material being delivered in any suitable manner onto the upper run of this belt which is carried by a series of supporting rollers 4, inclined to dish the belt in the usual manner. A tripper 5 is supported by wheels 6 and 7 on a track-way 8, supported centrally in super-structure 2, so that the tripper may move from one end of the bin to the other. The upper load-carrying run of belt 3 inclines upwardly at 80 and passes around a roller 9 on the tripper 5, so as to discharge the material into the receiving hopper 10 on the tripper. The upper run of the belt then passes in a reverse direction about a second roller 11 and proceeds, unloaded, to the far end of the bin, where it passes about a roller 12 and returns as the bottom, idle run of the belt. The tripper may be driven by suitable gearing 13 connected with one set of supporting wheels 7, this gearing being clutched alternatively to either of the rollers 9 or 11, whereby the direction of travel of the tripper may be reversed without changing the direction of travel of the conveyor belt 3. This reversal may be accomplished automatically at each end of the bin, or may be done manually by an attendant. Or the tripper may be driven by cables extending to the ends of the bin. The material delivered into the hopper 10 is discharged through two similar chutes 14 extending down at each side of the track-way 8. The speed and capacity of the tripper 5 will be so designed that the material will be bedded down within the bin in a comparatively thin, substantially uniform layer extending from end to end of the bin. These successive layers of material are indicated at 15 in Figs. 1 and 2. It is not necessary that the layers be flat, or substantially plane, in fact with the mechanism designed as shown in Fig. 2, the upper surface of the layers will have an undulating conformation, as indicated by dotted lines in that figure. This is in no way objectionable, since the ultimate object of this apparatus is to secure a thorough mixing of the materials.

The bottom of the bin is divided by a plurality of transverse partitions 16, the sides of which converge outwardly and downwardly to form a plurality of delivery chutes 17. The approximate plane in which the several chutes are located is inclined downwardly from one end of the bin to the other so that material from different bedded layers will be simultaneously delivered through the several chutes. As best shown in Fig. 3, an endless apron feeder 18, travelling in the direction of the arrows, serves to cause the material to flow in a steady stream from the chute 17 and be delivered through a second chute 19. Suitable means is provided for simultaneously driving the several feeders 18 at approximately constant speeds. A regulating gate 20 is adjustable into or out of the opening of chute 17 to regulate the discharge therefrom, by means of a hand wheel 21 on shaft 22, which carries pinions 23 meshing with racks 24 on the gate. An endless conveyor belt 25 traveling in the direction of the arrows, receives the material delivered through chute 19 from the several feeders 18 and carries this material out through housing 26 to any desired delivery point. It will be apparent that the several lots of material from the several simultaneously operating feeders, will be deposited one on top of the other on belt 25 and thus be assembled and thoroughly mixed, so that an average and uniform grade of material will be discharged in a steady stream, as desired, by the conveyor belt 25.

In the example shown, the material is bedded down in substantially horizontal layers, and drawn off by feeders located at successively different elevations along the standing bottom of the bin. The same result can be accomplished by having all of the feeders on the same level and bedding down the material in layers inclined upwardly from one end of the bin to the other.

In starting the operation of the form of apparatus disclosed in the drawings, a wedge of the material is first filled into the bin (more material being placed in the right hand end than in the left hand end, as shown in the drawings,) so that the upper surface of the material within the bin will be substantially horizontal. Afterwards, the tripper is operated in the manner already described, to lay down the material in a plurality of substantially horizontal layers. As the feeders 18 are operated, the material will be withdrawn from the bottom of the bin in substantial equal amounts from end to end thereof, and the layers 15 will settle vertically. After the original wedge of material has been withdrawn, further amounts of material will be drawn from different beds or layers by the several feeders. In the alternative form of apparatus mentioned hereinabove, with the feeders all located in substantially the same horizontal plane, a wedge of material will first be filled into the bin so that the upper surface of the mass will be considerably higher at one end of the bin than at the other. The material is then fed in by the tripper mechanism so as to lay down the material in a plurality of layers all similarly inclined. If desired, the tripper mechanism may be arranged to travel on a similar inclination at the top of the bin. After the original wedge of material has been withdrawn from the bin, the material will be withdrawn by the feeders from different beds or layers in the same manner as in the preferred form of apparatus first described.

In any case, the inclination between the bedded layers and the plane of draw-off should be such that the difference in elevation at the ends of the bin will be equal to the draw-off, considering the entire bin during the period in which it is desired to average the entire feed.

The several pieces of apparatus herein described and shown, by way of example, for depositing and withdrawing the material may be varied considerably in form without departing from the principles of this invention. Instead of apron feeders, revolving feeders or any other type capable of giving a uniform feed can be uesd.

In operation, the speed and feeding capacity of the several feeders will be so adjusted that the aggregate feed from all of the simultaneously operated feeders will be the amount desired. The tripper or other depositing apparatus at the top of the bin will have a larger capacity, so that sufficient material may be bedded down during one shift, or a relatively small portion of the day, to supply the feeders for practically continuous operation. When the tripper is not in operation, the level of the accumulated material within the bin will settle, but this will not appreciably affect the operation of the feeding mechanism, and when the tripper is once again put into operation, the ban can be once more filled to substantially its full capacity.

It will be seen that the operation of this apparatus is largely automatic, and requires little attention, and a steady and continuous feed of a uniform grade of material is provided for. The necessary ground space is constant, and is much less than is required for the several bedded piles heretofore used.

It will be apparent that by suitably adjusting the speed of the feeders 18, and the positions of the regulating gates 20, the rate of feed of the material from the bin to the furnaces or other place of consumption can be varied as found desirable. This is entirely independent of the rate at which the material is deposited or bedded down within the bin, which operation may be accomplished as rapidly as is found to be desirable or practicable, and at such intervals as may be necessary.

While the apparatus as above described will very satisfactorily mix a series of lots of material of varying quality, greater perfection may be attained, if desired or found necessary, by operating two or more of these units in series. In other words, the material delivered from one of these bins would be bedded down within a second bin and the withdrawing operation repeated.

I claim:

1. The process of mixing materials consisting in accumulating a laterally confined but vertically movable mass of the material by bedding down successive substantially horizontal layers of the material, the plane of the lower face of the accumulated mass being inclined to the horizontal so as to simultaneously intersect a plurality of the layers, and withdrawing the material from all parts of this lower plane so that the mass will settle uniformly.

2. The process of mixing materials consisting in accumulating a laterally confined but vertically movable mass of the material by bedding down successive substantially horizontal layers of the material, the plane of the lower face of the accumulated mass being inclined to the horizontal so as to simultaneously intersect a plurality of the layers, and substantially simultaneously and uniformly withdrawing the material from the mass at a plurality of closely spaced locations along this lower plane and assembling the withdrawn portions.

3. An apparatus for automatically mixing material comprising a storage bin, a tripper positioned to travel above the bin from end to end thereof for depositing substantially parallel layers of the material within the bin, the bottom of the bin being inclined to the average planes of these layers and formed with a plurality of delivery chutes spaced at frequent intervals throughout the length of the bin so as to simultaneously draw material from the entire lower surface of the accumulated mass and from a plurality of superposed layers thereof, means for regulating the flow of material through these chutes, and a traveling conveyor positioned below the chutes for receiving and assembling the material delivered from the several chutes and carrying same to a common discharge point.

4. An apparatus for automatically mixing material comprising a storage bin, a tripper positioned to travel above the bin from end to end thereof for depositing substantially parallel layers of the material within the bin, the bottom of the bin being inclined to the average planes of these layers and formed with a plurality of delivery chutes spaced at frequent intervals throughout the length of the bin so as to simultaneously draw material from the entire lower surface of the accumulated mass and from a plurality of superposed layers thereof, a plurality of simultaneously driven feeders for regulatably delivering material from the chutes, and a conveyor belt traveling beneath the feeders for receiving the material and conveying same to a common discharge point.

5. An apparatus for automatically mixing material comprising a storage bin, a conveyor belt traveling above the bin, a tripper mounted to travel from end to end of the bin, the tripper being driven by the belt and receiving the material therefrom and depositing it in the bin as a succession of substantially parallel layers, the bottom of the bin being inclined to the average planes of these layers and formed with a plurality of delivery chutes spaced at frequent intervals throughout the length of the bin so as to simultaneously draw material from substantially the entire lower surface of the accumulated mass and from a plurality of superposed layers thereof, a plurality of simultaneously driven feeders for regulatably delivering material from the several chutes, and a conveyor belt traveling beneath the feeders for receiving the material and conveying it to a common discharge point.

6. An apparatus for automatically mixing material comprising a storage bin, means for successively bedding down therein substantially horizontal layers of the material the layers being of substantially equal area and superposed upon one another and confined between the side and end walls of the bin whereby as the material is removed from beneath the layers will settle within the bin as a unitary mass, and means positioned below the bin for simultaneously removing material from a plurality of the superposed layers.

7. An apparatus for automatically mixing material comprising a storage bin, means for successively bedding down therein substantially horizontal layers of the material the layers being of substantially equal area and superposed upon one another and confined between the side and end walls of the bin whereby as the material is removed from beneath the layers will settle within the bin as a unitary mass, the bottom of the bin being inclined to the horizontal and formed with a plurality of spaced delivery openings, and means for receiving and assembling the material discharged from the several openings.

8. An apparatus for automatically mixing material comprising a storage bin, means for successively bedding down therein substantially horizontal layers of the material the layers being of substantially equal area and superposed upon one another and confined between the side and end walls of the bin whereby as the material is removed from beneath the layers will settle within the bin as a unitary mass, the bottom of the bin being inclined to the horizontal and formed with a plurality of spaced delivery chutes, and a traveling conveyor positioned below the chutes for receiving and assembling the material delivered from the several chutes and carrying same to a discharge point.

9. An apparatus for automatically mixing material comprising a storage bin, a tripper positioned to travel above the bin from end to end thereof for depositing substantially parallel layers of the material within the bin, the bottom of the bin being inclined to the average planes of these layers and formed with a plurality of delivery openings spaced at frequent intervals throughout the length of the bin so as to simultaneously draw material from the entire lower surface of the accumulated mass and from a plurality of superposed layers thereof, and means for receiving and assembling the material delivered from the several openings.

ANDREWS ALLEN.